United States Patent [19]
Ghosh

[11] Patent Number: 6,160,040
[45] Date of Patent: Dec. 12, 2000

[54] WATER BORNE CAPPED ESTER CONTAINING EPOXY AMINE ADDUCT CURING AGENTS COMPOSITIONS FOR SELF-CURING EPOXY RESINS AT AMBIENT OR SUB-AMBIENT TEMPERATURES

[75] Inventor: Kalyan Ghosh, Richmond, Tex.

[73] Assignee: Shell Oil Company, Houston, Tex.

[21] Appl. No.: 09/002,290

[22] Filed: Dec. 31, 1997

Related U.S. Application Data

[60] Provisional application No. 60/034,618, Dec. 31, 1996.

[51] Int. Cl.[7] .............................. C08K 3/20; C08L 63/02
[52] U.S. Cl. ..................... 523/404; 523/438; 525/423; 525/524; 525/533
[58] Field of Search ................................ 525/423, 430, 525/438, 449, 524, 533; 523/404, 438

[56] References Cited

U.S. PATENT DOCUMENTS

| | | | |
|---|---|---|---|
| 3,034,879 | 5/1962 | Spacht | 44/71 |
| 3,542,728 | 11/1970 | Gersmann et al. | 260/45.85 |
| 3,785,790 | 1/1974 | Strang | 44/66 |
| 3,954,964 | 5/1976 | Kuderna, Jr. | 424/76 |
| 4,090,971 | 5/1978 | Hoke | 252/51.5 A |
| 4,177,174 | 12/1979 | Hayashi et al. | 525/450 |
| 4,229,335 | 10/1980 | Ting et al. | 260/29.4 R |
| 4,388,426 | 6/1983 | Schure et al. | 523/462 |
| 4,457,800 | 7/1984 | Schure et al. | 156/307.3 |
| 4,609,691 | 9/1986 | Geist et al. | 523/415 |
| 4,673,765 | 6/1987 | Bertram et al. | 564/155 |
| 5,290,463 | 3/1994 | Habeeb | 252/51.5 A |
| 5,354,789 | 10/1994 | Kamikado | 523/420 |
| 5,567,748 | 10/1996 | Klein et al. | 523/420 |
| 5,643,976 | 7/1997 | Arora et al. | 523/404 |
| 5,770,658 | 6/1998 | Baudoul et al. | 525/423 |

FOREIGN PATENT DOCUMENTS

| | | | |
|---|---|---|---|
| 864-953 | 9/1978 | Belgium. | |
| 163890 | 7/1976 | Czechoslovakia. | |
| 48078-254 | 10/1973 | Japan. | |
| 50117-899 | 9/1975 | Japan. | |
| 57105-447 | 6/1982 | Japan | C08K 03/34 |
| 61172153 | 8/1986 | Japan | G03G 09/08 |
| 02018412 | 1/1990 | Japan. | |
| 05271584 | 10/1993 | Japan | C09D 5/46 |
| 07207197 | 8/1995 | Japan. | |
| 100766 | 3/1979 | Poland. | |
| 2127829 | 4/1984 | United Kingdom. | |

OTHER PUBLICATIONS

U.S. application No. 09/002,271, Ghosh et al., filed Dec. 31, 1997.

Primary Examiner—Robert Dawson
Assistant Examiner—D. Aylward
Attorney, Agent, or Firm—Dennis V. Carmen

[57] ABSTRACT

There is provided a surfactant composition, a stable, self emulsifiable water borne curing agent composition, and methods for the manufacture of each, and two component water borne curable epoxy resin compositions. The surfactant composition comprises the reaction product of an a) a phenolic acid substituted with at least one carboxyl group and at least one hydrocarbyl group having at least 1 carbon atom; b) a polyepoxide compound; c) a polyamine compound having at least two primary amine groups; d) a reactive surfactant; and optionally e) a monoglycidyl, monocarboxylic acid, or monoisocyanate capping agent; wherein the reactive surfactant comprises an epoxide, a carboxylic acid or anhydrides thereof, or an isocyanate functional moeity, and a hydrophilic moiety comprising a polyoxyalkylene monool or polyol residue. The reactive surfactant comprises a compound represented by one of the following formulas:

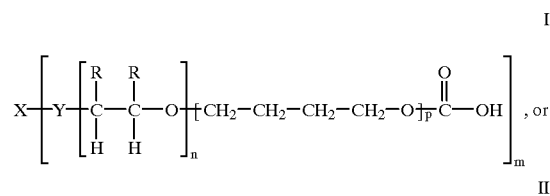

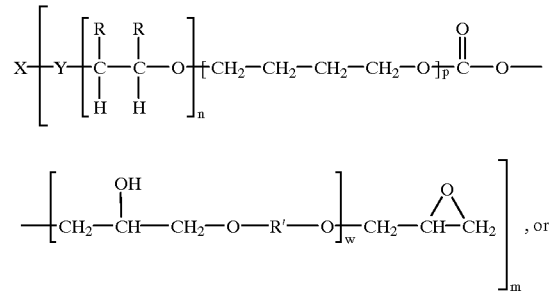

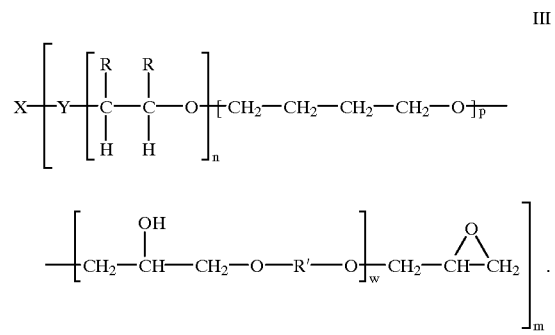

64 Claims, No Drawings

WATER BORNE CAPPED ESTER CONTAINING EPOXY AMINE ADDUCT CURING AGENTS COMPOSITIONS FOR SELF-CURING EPOXY RESINS AT AMBIENT OR SUB-AMBIENT TEMPERATURES

This application claims the benefit of U.S. Provisional Application Ser. No. 60/034,618, filed Dec. 31, 1996, the entire disclosure of which is hereby incorporated by reference.

FIELD OF THE INVENTION

This invention is related to a surfactant composition and to water borne, self emulsifiable, stable curing agent compositions for epoxy resins, curable at ambient and sub-ambient temperatures in the absence of external catalysts/accelerators. The invention is also directed to methods of application and manufacture, as well as to the cured products made thereby.

BACKGROUND OF THE ART

There has long been a desire to formulate a curing agent which is essentially free of volatile organic compounds (VOC's), which are self emulsifiable and curable at a wide range of temperatures in the absence of external accelerators if possible.

Many of the current water borne epoxy resins and curing agents are plagued with the problem of poor film properties because the surfactants tend to migrate to the surface during the cure of the resin system. Thus, it would be desirable to provide a curing agent system containing a surfactant which does not migrate during cure, that is, a self emulsifiable system which does not require salting the surfactant or using plasticizers to stably disperse the curing agent in water.

In addition to providing a self emulsifiable water borne curing agent, the curing agent should be readily compatible with a water borne epoxy resin in order to make a coating having good mechanical properties and weatherability. A water borne curing agent that does not have good compatibility with the epoxy resin will not coalesce well when applied onto a substrate. The problem of compatibility is more acute where the curing agent primary amine groups have been converted to secondary amine groups to reduce the blooming or hazing phenomena.

Further, in view of the continuous need to provide curing agents which are environmentally friendly, the self emulsifiable curing agent should contain little or no VOC's, that is, be dispersed in water or other non-VOC, without the need to use co-solvents to solubilize the curing agent. Moreover, the surfactant used to disperse the curing agent should be effective to disperse large quantities of the curing agent to provide a high solids level. Of course, the water borne curing agent should also be stable, at least long enough to mix, store, ship and apply.

It is also desirable that the water borne curing agent cure water borne epoxy resins at ambient temperatures, preferably without the use of external accelerators or catalysts. This would reduce the overall cost of the system and avoid the potential for migration of catalyst from the coating. Thus, the curing agent should be sufficiently reactive so that accelerators are not needed for room temperature cure, but not excessively reactive that on loses the pot life needed for applying or working with the system.

SUMMARY OF THE INVENTION

It is an object of the invention to provide a self emulsifiable curing agent. It is also an object of the invention to provide a stable water borne curing agent. It is a further object of the invention to provide a stable water borne curing agent which is essentially free of VOC's, and preferably free of VOC's. Another object of the invention is the manufacture of a water borne curing agent which does not require the use of external accelerators or catalysts, yet is reactive enough to cure water borne epoxy resins at ambient temperatures. Finally, it is an object of the invention to provide a water borne curing agent which is compatible with a water borne epoxy resin. There is provided a surfactant composition, a stable water borne curing agent system, and methods for the manufacture of each, which satisfy one or more of these objects. There is also provided a water borne two component curable epoxy resin compositions and methods of their application, and the different cured products thereof.

The surfactant composition comprises the reaction product of an a) a phenolic acid substituted with at least one carboxyl group and at least one hydrocarbyl group having at least 1 carbon atom; b) a polyepoxide compound; c) a polyamine compound having at least two primary amine groups; d) a reactive surfactant; and optionally e) a monoglycidyl, monocarboxylic acid, or monoisocyanate capping agent; wherein the reactive surfactant comprises a functional moiety reactive with secondary amines and a hydrophilic moiety of a nature and length effective to disperse a curing agent in water. The functional moiety in the reactive surfactant comprises an epoxide group, a carboxylic acid group or anhydrides thereof, an isocyanate group, or mixtures thereof; and the hydrophilic moiety in the reactive surfactant comprises a polyoxyalkylene monool or polyol residue. The reactive surfactant comprises a compound represented by one of the following formulas:

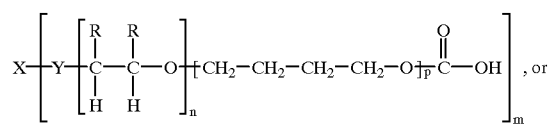

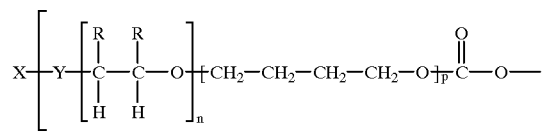

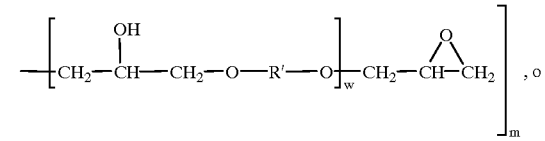

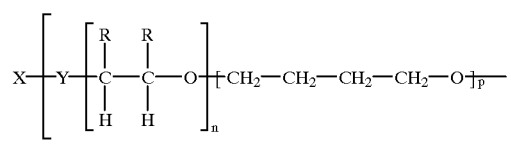

-continued

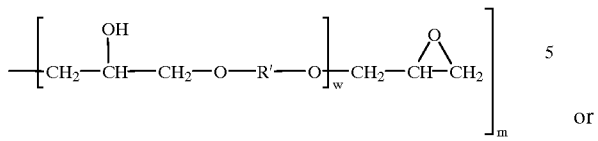

wherein X represents an intiator molecule residue, the initiator having a functionality of from 1 to 8; Y represents an oxygen or nitrogen atom; each of the R's independently represent a hydrogen, an $C_1$–$C_{16}$ alkyl, aryl, or alkaryl group, provided that at least on R is a hydrogen; R' represents an epoxy resin residue comprising a divalent aliphatic group, a divalent cycloaliphatic group, a m divalent aryl group, a divalent arylaliphatic group, or a divalent alkaryl group, each having from 2 to 1000 carbon atoms; m represents a real number from 1 to 8; n and p represent the number of repeating units of oxyalkylene groups effective to stably disperse the curing agent composition in water; and w represents the number of epoxy glycidyl ether units, ranging from 0 to 20. The X, Y, n and p units are derived from a polyoxyalkylene monool or polyol represented by the formula:

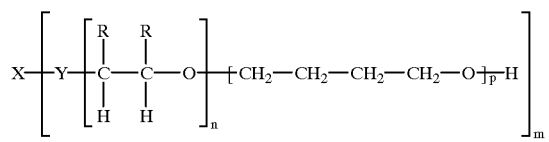

In one embodiment, the surfactant composition comprises a compound represented by at least one the following formulas:

or $R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, an aryl group, an alkaryl group, or an aralkyl group; $R_7$ is the residue of said b) polyepoxide compound; $R_5$ and $R_9$ are each independently hydrogen, or a branched or unbranched, substituted or unsubstituted, alkyl group or alkaryl group or cycloaliphatic group, or the residue of said d) reactive surfactant; $R_8$ is the residue of said d) reactive surfactant; c represents an integer from 1–10; and k represents an integer from 0–10; provided that at least one $R_5$ group is said the residue of said d) reactive surfactant.

There is also provided a stable water borne curing agent composition comprising a solid phase dispersed in a continuous phase, the continuous phase comprising water, the solid phase comprising a curing agent composition and the surfactant composition. In one embodiment, the amount of surfactant composition in the stable water borne curing agent composition is from 1 wt. % to 10 wt. %, based on the weight of the solid phase, and the stable water borne curing agent composition comprises 40 wt. % or more solids dispersed in the continuous phase, based on the weight of all ingredients in the water borne curing agent composition. The average particle size of the solid phase is advantageously less than $2\mu$.

In a process for making the surfactant composition, the phenolic acid compound is reacted with the polyepoxide compound to produce a substituted aromatic glycidyl ester wherein $R_1$ is a branched or unbranched, substituted or unsubstituted, monovalent hydrocarbyl group having at least on carbon atom; $R_2$ and $R_4$ each independently represent a branched or unbranched, substituted or unsubstituted, divalent hydrocarbyl group having 2–24 carbon atoms, or compound, wherein the substituted aromatic glycidyl ester compound is reacted with the polyamine compound to make a subsituted aromatic glycidyl ester-amine adduct, followed by i) combining and reacting the e) capping agent with said substituted aromatic glycidyl ester-amine adduct to form a capped substituted aromatic glycidyl ester-amine adduct, followed by combining and reacting the d) reactive surfactant, or ii) combining and reacting the substituted aromatic glycidyl ester-amine adduct with the d) reactive surfactant.

The curable two component systems, a water borne epoxy resin and a water borne curing agent, can be cured to form coatings and in flooring, casting, crack or defect repair, molding, adhesives, potting, filament winding, encapsulation, structural and electrical laminates, composites and the like.

DETAILED DESCRIPTION OF THE INVENTION

The water borne curing agent composition of the invention is a solid phase dispersed in a continuous phase, the continuous phase comprising water, the solid phase comprising a curing agent composition and a surfactant composition. The dispersion can be a suspension, emulsion, or a colloidal dispersion. The aqueous continuous phase can contain other liquids in admixture, but is preferably free of any VOC's and free of any cosolvents. By an continuous phase that is essentially free of VOC's is meant that 5 wt. % or less of the water borne curing agent composition is a VOC.

The aqueous dispersion of the invention is also stable, meaning that there is no evidence to the naked eye that the solid and liquid phases have phase separated into discrete layers at 30 days of storage at 23° C. without agitation or disturbance. Preferably, the water borne compositions do not exhibit phase separation even at 2 months, more preferably at 6 months of storage.

Another attribute of the invention is that the water borne curing agent of the invention can be made stable without the use of plasticizers or organic acids typically used to make salt the curing agent, that are usually present in water borne compositions. The water borne curing agent composition of the invention is self emulsifiable, meaning that the curing agent has the capacity to stably disperse in water at a solids level of at least 40 wt. %, preferably 50 wt. % or more, in the absence of solvents, plasticizers, or salting organic acids.

A further attribute of the invention is that the water borne compositions of the invention cure well and are compatible with water borne epoxy resins at ambient temperatures in the absence of external cure accelerators. The specular gloss readings taken from samples of the water borne curing agent compositions of the invention reacted with water borne epoxy resins indicate that the curing agent compositions of the invention sufficiently cured the epoxy resin component at ambient temperature.

The surfactant composition comprises the reaction product of an a) a phenolic acid substituted with at least one carboxyl group and at least one hydrocarbyl group having at least 1 carbon atom; b) a polyepoxide compound; c) a polyamine compound having at least two primary amine groups; d) a reactive surfactant; and optionally e) a monoglycidyl, monocarboxylic acid, or monoisocyanate capping agent. The features, structure, and process for making the surfactant composition is as follows.

The structure of the phenolic compound is an aromatic ring to which is covalently bonded at least one hydroxyl group, at least one hydrocarbyl group, and at least one carboxyl group. Usually and preferably, the structure of the phenolic compound will contain only one hydroxyl group and one carboxyl group bonded to the aromatic ring. However, it is rare if not impossible to commercially acquire a phenolic compound which is so pure that it contains only one species. Commercially available phenolic compounds usually contain a mixture of species, such as mono and di carboxyl substituted phenolics. Thus, while the preferable embodiment is one in which the phenolic compound contains only one of each group bonded to the aromatic ring, this embodiment includes a phenolic which contains a mixture of species in which the predominant (>70 mole percent) species has only one carboxyl group and one hydroxyl group bonded to the aromatic ring.

One of the substituents on the aromatic ring of the phenolic compound is the hydrocarbyl group. While the hydrocarbyl group can comprise a wide variety of structures and atoms, it must have a predominantly hydrocarbon character. Included within the meaning of a hydrocarbyl group are the alkyl or alkenyl groups, the aliphatic substituted aromatic or alicyclics, or the aromatic or alicyclic substituted alkyls or alkenyls. Each of these groups may be branched or unbranched. The phenolic compound preferably contains at least 50 mole % species which have only one hydrocarbyl substituent.

The substituent on the substituted aryl amidopolyamine is at least one hydrocarbyl group having at least one carbon atom. Longer chain hydrocarbyl groups are preferred. All else remaining equal, a curing agent having longer chain hydrocarbyl substituents, i.e. 8 or more and preferably greater than 12, most preferably 14 or more, tend to be more hydrophobic than the curing agents having short chain hydrocarbyl groups on the order of 1–7 carbon atoms. In many applications, the hydrophobic character of the hydrocarbyl substituent is desirable to improve the compatibility of the curing agent with the epoxy resin component. Further, long chain hydrocarbyl substituents are somewhat more flexible than their shorter chain counterparts, thus lowering the glass transition temperature of the curing agent. It is desirable to have a curing agent with a lowered glass transition temperature to improve its flow properties in low temperature curing conditions. Thus, the most preferred hydrocarbyl groups are those having 14 or more carbon atoms. Although there is no particular upper limit on number of carbon atoms, the most common number of carbon atoms used within this invention will be 14–24, most preferably from 14–18, although hydrocarbons with up to 36 carbon atoms are also available.

Of the types of hydrocarbyl substituents, the alkyls are preferred. These can be branched or unbranched, preferably unbranched or having no more than 1 branch per 6 backbone carbon atoms. Examples of alkyl substituents having at least about 8 carbon atoms include octyl, nonyl, decyl, isodecyl, dodecyl, pentadecyl, eicosyl, triacontyl and the like, as well as radicals derived from substantially saturated petroleum fractions, olefin polymers and highly refined white oils or synthetic alkanes.

Other types of hydrocarbyl groups which are suitable include substituted hydrocarbyl groups; that is, groups containing non-hydrocarbon substituents which do not alter the predominantly hydrocarbon character of the group. Examples are halo, nitro, cyano, ether, carbonyl, and sulfonyl groups. Also included are hetero atoms which are atoms other than carbon present within a chain or ring otherwise composed of carbon atoms. Suitable hetero atoms include, for example, nitrogen, oxygen, and sulfur. Further included within the meaning of the hydrocarbyl group are the alkoxy compounds.

Preferably, no more than an average of one substituent or hetero atom will be present for each 10 carbon atoms in the hydrocarbyl group, and most preferably, the hydrocarbyl group does not contain any hetero atoms or substituents.

The phenolic compound may contain more than one hydrocarbyl substituent on its aromatic ring. The dihydrocarbyl phenolic compounds have a long chain hydrocarbyl of 14 or more carbon atoms and a short chain hydrocarbyl of 1–4 carbon atoms attached to the aromatic ring, or both of the hydrocarbyls may be long chain. As noted above, however, preferably greater than 50 mole % of the species contain only one hydrocarbyl substituent.

The phenols on which the hydrocarbyl and carboxyl groups are situated, are aromatic compounds containing at least one, and preferably one, hydroxyl group. Examples are phenol, α- or β-naphthols, resorcinol, hydroquinone, 4,4'-dioxydiphenyl, 4,4'-dioxydiphenylether, 4,4'-dioxydiphenylsulfone, 4,4'-dioxydiphenylmethane, the condensation products of phenol and formaldehyde known as novolacs, and bis(4-hydroxyphenyl)alkyls or ethers or sulfones optionally substituted with alkyl groups on the aromatic rings. Phenol is preferred.

To substitute the hydroxyl aromatic compound with the hydrocarbyl group, a hydrocarbon-based compound of the hydrocarbyl group as mentioned above is reacted with the hydroxyl aromatic compound at a temperature of about 50°–200° C. in the presence of a suitable catalyst such as aluminum chloride, boron trifluoride or zinc chloride.

The phenolic compound also contains at least one carboxyl group as a substituent, and preferably only one carboxyl group per aromatic ring. The carboxyl group is bonded directly to the aromatic phenolic ring, or indirectly to the ring through an aliphatic chain. Preferred, however, is a carboxyl group bonded directly to the aromatic ring of the phenolic compound at the ortho or para positions to the phenolic hydroxyl group. Further, within the meaning of a carboxyl group are the alkyl esters and anhydrides of the carboxyl substituents.

Examples of the carboxyl groups bonded to the phenolic aromatic ring are those derived from carboxylic acids containing 0–24 carbon atoms, not counting the carboxylic acid carbon. The carboxylic acids from which the substituents are derived include -formic acid (a -carboxy acid), -acetic acid, -proprionic acid, or -stearic acid substituents. A particularly preferred carboxyl group is a carboxy acid in view of its high reactivity with amines.

The phenolic compound containing the carboxyl and the hydrocarbyl groups can be prepared by methods which are known in the art as the "Kolbe-Schmitt reaction," which comprises reacting a salt, preferably an alkali metal salt, of the hydrocarbyl substituted phenol with carbon dioxide and subsequently acidifying the salt thus obtained. The conditions of the carbonation reaction are likewise well known to those skilled in the art. It may be carried out at atmospheric or superatmospheric pressure in a substantially inert, non-polar liquid diluent.

A particularly preferred phenolic compound is a hydrocarbyl substituted salicyclic acid. This phenolic compound is a good building block toward producing a curing agent which has good flow, reactivity, and compatibility with epoxy resins at low cure temperatures in the absence of external accelerators/catalysts, and a good balance of mechanical properties and water, corrosion and humidity resistance properties.

In a more preferred embodiment, the phenolic compound used in the invention is a salicyclic acid substituted with a 14–18 linear carbon alkyl group located at the o- or p-position to the phenolic hydroxyl group. The preparation of alkyl substituted salicyclic acids is described in U.S. Pat. No. 3,013,868, incorporated herein by reference in its entirety.

To manufacture the substituted aromatic glycidyl ester composition, the phenolic acid described above is reacted with an polyepoxide at an elevated temperature, typically from 140° C. to 180° C., for a time sufficient to substantially complete the reaction, usually from about 1 to about 8 hours. It is advisable not to let the reaction temperature rise too much above 170° C.–180° C. for an extended period of time in order to avoid the possibility of de-carboxylting the phenolic compound, which would result in the production of free phenolic compounds in the reaction mixture. The reaction can be conducted at any pressure ranging from a partial vacuum to superatmospheric pressure. To drive the esterification reaction between the carboxyl group on the phenolic compound and the polyepoxide compound to completion, it is preferred to apply a partial vacuum either during the course of the reaction or towards the tail end of the reaction. The reaction is substantially completed when free acid can no longer be detected in the composition. The ingredients can be mixed together and subsequently reacted, but preferably, the phenolic acid is added to the polyepoxide compound so as to reduce the possibility of reacting both of the oxirane groups on the polyepoxide compound with the phenolic acid.

The reaction between the polyepoxide compound and the phenolic acid are suitably carried out at molar ratios of at least 1:1, preferably greater than 1:1 such as at least 2:1, and even 3:1 on up. It is desirable to use a molar excess of the polyepoxide compound so that one of the oxirane groups on the polyepoxide compound is free to react with the polyamine compound and does not react with further phenolic acids. If a stoichiometric amount of the phenolic acid is added to the polyepoxide compound such as at a molar ratio of polyepoxide to phenolic acid of 0.5:1 or less (the stoichiometry proceeding upon the assumption that the phenolic acid has only one functional group, the acid group, and a diepoxide is used), then both of the oxirane groups will be consumed by the acid group on the phenolic compound. Therefore, a stoichiometric excess of oxirane groups (>0.5:1) is desired to ensure that the substituted aromatic glycidyl ester compound has free oxirane groups available for reaction with the polyamine compound.

The reaction between the phenolic acid and the polyepoxide compound may be carried out in the presence or absence of solvents or catalysts, typically in the presence of both. Suitable solvents include alcohols, ketones, esters, ethers of hydrocarbons. Examples of suitable solvents are butanol, methyl isobutyl ketone, toluene, ethylglycol acetate, xylene, benzyl alcohol, phthalic acid esters of monohydric alcohols, e.g. n-butanol, amylalcohol, 2-ethylhexanol, nonanol, benzyl alcohol, gamma-butyrolactone, delta-valerolactone, epsilon-caprolactone, lower and higher molecular weight polyols, e.g. glycerol trimethylol-ethane or -propane, ethyleneglycol, and ethoxylated or propoxylated polyhydric alcohols, either individually or in admixture.

If a catalyst is employed, one could use a Lewis acid, metal salts, and bases. Examples include triethylamine, triethylamine, benzyldimethylamine, tris(dimethylaminomethyl)phenol, dimethylethanolamine, n-methymorpholine, benzyl trimethyl ammonium chloride, ethyl triphenyl phosphonium salts, tetrabutyl phophonium salts, and stannous salts of carboxylic acids. Typical amounts of catalyst used range from 0.1 to 100 ppm.

The polyepoxide used in the invention is any polyepoxide having an average of 1.5 or more oxirane groups per molecule, preferably 1.7 or more oxirane groups. The polyepoxide compounds can be monomeric or polymeric, saturated or unsaturated, aliphatic, cycloaliphatic, aromatic or heteroaromatic and may be substituted, if desired, with other substitutents in addition to the epoxy groups with, for example, hydroxyl groups or halogen atoms such as bromine.

Suitable polyepoxide compounds are the reaction products of polyphenols and epihalohydrins, polyalcohols and epihalohydrins, amines and epihalohydrins, sulfur containing compounds and epihalohydrins, polycarboxylic acids and epihalohydrins or mixtures thereof.

Preferred polyepoxide compounds include, but are not limited to, any one of those represented by the formulas:

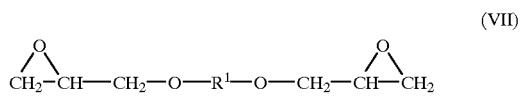
(VII)

or

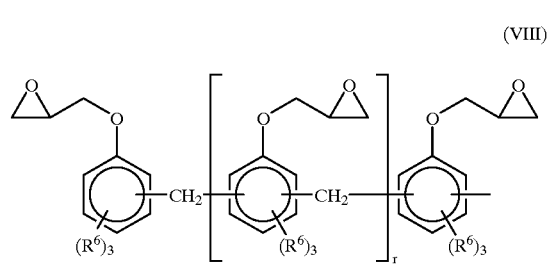
(VIII)

or

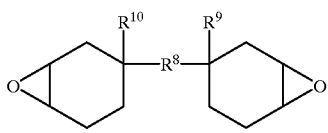

or

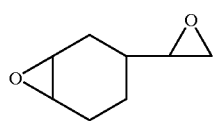
(IX)

wherein r is a real number from about 0 to about 6, $R^1$ is a divalent aliphatic group, a divalent cycloaliphatic group, a divalent aryl group, a polyoxyalkylene group, or a divalent arylaliphatic group, $R^6$ is independently a hydrogen or a $C_1$–$C_{10}$ alkyl group, $R^8$ is a divalent aliphatic group optionally containing ether or ester group(s) or together with $R^9$ or $R^{10}$ lo form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen.

$R^1$ can be a divalent cycloaliphatic group having the formula:

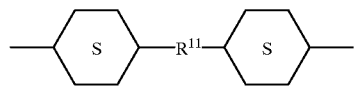

or

wherein $R^{11}$ and $R^{12}$ are each independently an alkylene group, or a divalent arylaliphatic group having the formula

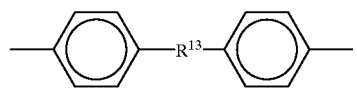

wherein $R^{13}$ is an alkylene group.

For the polyepoxide compound having a nominal functionality of two or more, the epoxy compound is preferably a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl)propane (bisphenol-A); 2,2-bis(4-hydroxy-3-tert-butylphenyl) propane; 1,1-bis(4-hydroxyphenyl)ethane; 1,1-bis(4-hydroxyphenyl)isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with phenolic compounds such as bisphenol-A, such as those described in U.S. Pat. Nos. 3,477,990 and 4,734,468.

Diglycidyl ethers of hydrogenated dihydric phenols can be produced, for example, by hydrogenation of dihydric phenols followed by glycidation with epihalohydrin in the presence of a Lewis acid catalyst and subsequent formation of the glycidyl ether by reaction with sodium hydroxide. Examples of suitable dihydric phenols are listed above.

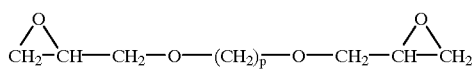
(X)

and Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. A representative formula is:

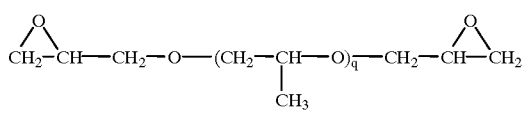

wherein p is an integer from 2 to 12, preferably from 2 to 6; and q is an integer from 4 to 24, preferably from 4 to 12.

Examples of suitable aliphatic glycidyl ethers include for example, diglycidyl ethers of 1,4 butanediol, neopentyl glycol, cyclohexane dimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by epihalohydrin the presence of an alkali. The phenol can be for example, phenol, cresol, nonylphenol and t-butylphenol. Examples of the preferred epoxy novolacs include those corresponding to the formula VIII above. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater than one olefinic bond with peracetic acid. Examples of the preferred cycloaliphatic epoxies include those corresponding to the formula IX above. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane], bis(3,4-epoxycyclohexylmethyl) adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

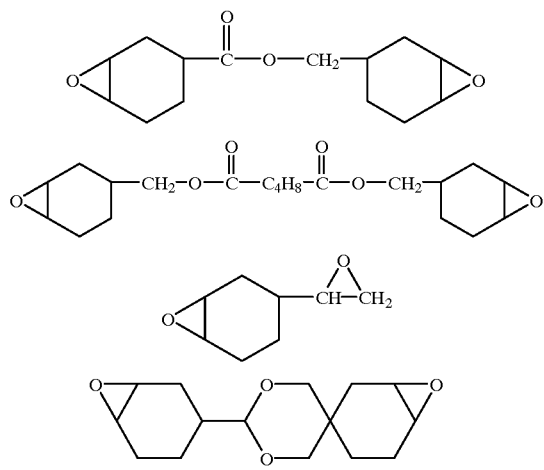

Commercial examples of the preferred epoxy compounds having a nominal functionality of two or more include, for example, EPON® Resins DPL-862, 828, 826, 825, 1001, EPONEX® Resin 1510, HELOXY® Modifiers 107, 67, 68, and 32; all available from Shell Chemical Company and Union Carbide Epoxy Resins ERL-4221, -4289, -4299, -4234 and -4206.

The reaction between the phenolic acid compound and the polyepoxide compound will produce a variety of species depending upon the particular phenolic acid functional sites which undergo reaction. The following reaction scheme represents two species produced between phenolic acid—polyepoxide reaction, where all of the carboxylic acid groups on the phenolic acid compound have been reacted:

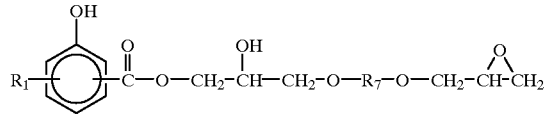

and

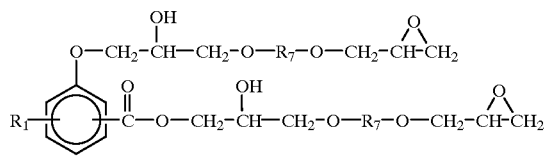

wherein $R_1$ is the hydrocarbyl substituent on the phenolic acid compound, and $R_7$ is the polyepoxide residue.

Once the substituted aromatic glycidyl ester composition is made, it is reacted with i) the c) polyamine compound, the e) monoglycidyl capping agent, and the d) reactive surfactant, in the stated sequence; or ii) a pre-reaction product of at least one equivalent of c) polyamine per equivalent of the d) reactive surfactant, followed by reaction onto the substituted glycidyl ester compound, in which case no capping agent is needed.

However, combining the polyamine and monoglycidyl capping agent in mixture with the substituted glycidyl ester compound, followed by reaction with the d) reactive surfactant, is also suitable for the purposes of the invention.

In the case where the surfactant composition is made in-situ, during the manufacture of the curing agent composition, the surfactant composition can be made by:

iii) reacting the reactive surfactant with a stoichiometric excess of the curing agent composition, where the curing agent composition comprises an end capped substituted aromatic glycidyl ester-amine adduct comprising the reaction product of said a), b), c), and e); or iv) pre-reacting the reactive surfactant with the c) polyamine compound, followed by reaction with a molar excess of the substituted aromatic glycidyl ester compounds, followed by reacting at least a molar equivalent amount, preferably a large molar excess, of a second portion of c) polyamine compound with the unreacted substituted aromatic glycidyl ester compounds to make a substituted aromatic glycidyl ester-amine adduct, and end capping at least a portion of unreacted primary amine groups remaining on said adduct with the e) capping agent.

Regardless of whether the surfactant composition is made and isolated as such, or made in situ, preferably at least one mole of the polyamine compound is reacted per mole of the substituted aromatic glycidyl esters, and more preferably the polyamine is reacted with the substituted aromatic glycidyl esters at a molar excess, such as at a molar ratio of 1.25:1 or more, more preferably 2:1 or more, in order to react out the all the oxirane groups and provide primary amino group termination. The reaction conditions are much like those described above with relation to the phenolic acid and the polyepoxide compound, except that typically no catalysts are needed. The temperature can range from 100° C. to 230° C., with the higher end of the temperature range initiated when vacuum distillation is applied. The substituted aromatic glycidyl ester composition is preferably added to the polyamine compound to ensure that the polyamine compound, once reacted, will have a free unreacted primary amine site available for reaction with the monoglycidyl capping agent. Once the amine reaction onto the substituted aromatic glycidyl ester composition is complete, the excess amine, if any, should be vacuum distilled off, typically at 20 in.Hg to 30 in.Hg for 30 to 480 minutes.

Suitable polyamines are those which have at lease two primary amine groups, where one of the primary amine groups is used for reaction with the carboxyl group on phenolic compound. A non-limiting example of polyamines useful in the practice of the invention is represented by the formula:

wherein n is an average of integers between about 0 and 10, preferably between 1 and 4; and X is a divalent branched or unbranched hydrocarbon radical having about 1–18 carbons, one or more aryl or alkaryl groups, or one or more alicyclic groups. Preferably, X is a lower alkylene radical having 1–10, preferably 2–6, carbon atoms. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included. Specific examples of polyamines include ethylene diamine, triethylene tetramine, tris(2-aminoethyl)-amine, 1,2- and 1,3-propylene diamine, trimethylene diamine, 1,2- and 1,4-butanediamine, hexamethylene diamine, decamethylene diamine, octamethylene diamine, diethylene triamine, triethylene tetramine, di(heptamethylene)triamine, tripropylene tetramine, tetraethylene pentamine, trimethylene diamine, pentaethylene hexamine, di(trimethylene)triamine, p- and m-xylylene diamine, methylene dianiline, 2,4-toluenediamine, 2,6-toluenediamine, diaminodiphenylmethane, polymethylene polyphenylpolyamine, diaminocyclohexane, isophoronediamine, 1,3-bis(aminomethyl)cyclohexane, 4,4'-diaminodicyclohexylmethane, and mixtures thereof. Higher homologs, obtained by condensing two or more of the above-illustrated alkylene amines, are also useful. More preferred are those polyamines containing at least one secondary amino group in addition to the at least two primary amino groups, and multiple divalent hydrocarbon radicals having 2–4 carbon atoms. Examples of the preferred polyamines are the aliphatic diamines having 2–8 carbon atoms, diethylenetriamine, triethylenetetramine, and tetraethylenepentamine.

The ethylene type polyamines, examples of which are mentioned above, are especially useful for reasons of cost and effectiveness. Such polyamines are described in detail under the heading "Diamines and Higher Amines" in Kirk-Othmer, Encyclopedia of Chemical Technology, Second Edition, Vol. 7, pp. 22–39. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. These mixtures are satisfactory in preparing the compositions of this invention.

Hydroxy polyamines, e.g., alkylene polyamines having one or more hydroxyalkyl substituents on the nitrogen atoms, are also useful in preparing amides of this invention. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)-ethylenediamine, N,N'-bis(2-hydroxyethyl)ethylenediamine, monohydroxypropyl-substituted diethylene triamine, dihydroxypropyltetraethylenepentamine and N-(3-hydroxybutyl)tetramethylenediamine. Higher homologs obtained by condensation of the above-illustrated hydroxyalkyl-substituted alkylene amines through amino radicals or through hydroxy radicals are likewise useful.

The d) reactive surfactant useful in the invention is one which contains a functional moiety reactive with secondary amines and a hydrophilic moiety of a nature and length effective to disperse the curing agent in water. The surfactant composition has a hydrophilic moiety of a nature and length effective to disperse the curing agent in water using only 1 wt % to 10 wt %, preferably 2 wt % to 6 wt %, more preferably only 2 wt % to 4 wt % of the surfactant composition, based on the weight of curing agent solids, to stably disperse the solids in the water borne curing agent composition at a solids level preferably from 45 wt % or more, more preferably 50 wt. % or more, and most preferably 60 wt. % or more. While one may use more surfactant composition than 10 wt %, or make an aqueous dispersion of less than 45 wt % solids, the surfactants employed to disperse the curing agent of the invention have the ability to stably disperse at least 45 wt. % solids at surfactant composition levels of 2 to 6 wt. % without any noticeable phase separation to the naked eye at 30 days of still storage.

The average particle size in the aqueous dispersions of the invention are also quite small, on the order of less than $2\mu$, preferably $0.5\mu$ or less. It is desirable to have as low a particle size as possible at as high a solids level as possible to obtain improved coalescence, thereby obtaining optimum film mechanical properties.

The reactive surfactant molecule contains groups reactive with a secondary amine group. By a group reactive with secondary amine group is not meant that the reactive surfactant molecule must be reacted onto a secondary amine group, but only that the functional group on the reactive surfactant molecule have sufficient reactivity to react with a secondary amine group. However, included within the reactive surfactant molecules used in the invention are those which have been altered such as by way of pre-reacting the reactive surfactant molecule with a polyamine compound.

Suitable reactive groups on the reactive surfactant molecule include epoxide, carboxylic acid and anhydrides thereof, and isocyanate functionalities. Any number of the same or independently different types of functional groups reactive with secondary amines may be bonded to the surfactant molecule. For example, the surfactant molecule may contain 1, 2, 3, etc epoxide and/or carboxylic acid groups per surfactant molecule. Suitable hydrophilic moieties in the surfactant molecule include, but are not limited to, polyoxyalkylene monool or polyol residues.

In a preferable embodiment, the reactive surfactant molecule is represented by one of the following formulas:

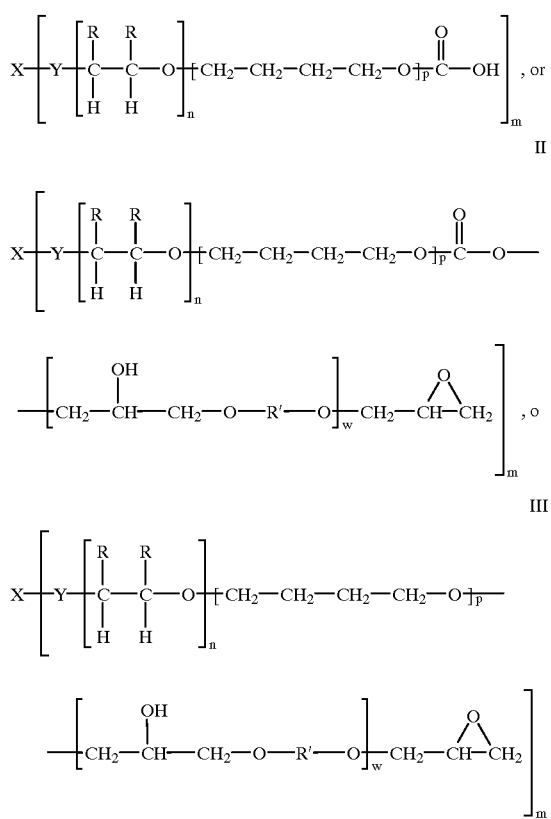

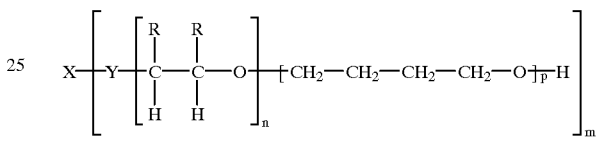

wherein X is an intiator molecule residue, the initiator having a functionality of from 1 to 8; Y represents an oxygen or nitrogen atom; each of the R's is independently a hydrogen, an $C_1$–$C_{16}$ alkyl, aryl, or alkaryl group, preferably hydrogen, a $C_1$–$C_4$ alkyl or nonylphenyl, most preferably hydrogen, methyl, or an ethyl group, provided that at least on R is a hydrogen; R' is an epoxy resin residue, generally a divalent aliphatic group, a divalent cycloaliphatic group, a divalent aryl group, or divalent arylaliphatic group, or a divalent alkaryl group, preferably each having from 2 to 1000 carbon atoms; m is a real number from 1 to 8, preferably from 1 to 3; n and p represent the number of repeating units of oxyalkylene groups effective to stably disperse the curing agent in water, which can range from 0 to about 4000, preferably from about 50 to 1000, provided that n+p= is at least 15; and w represents the number of epoxy glycidyl ether units, ranging from 0 to 20, preferably from 0 to 5. The surfactant preferably has a number average molecular weight within the range of from about 1000, preferably from about 2000, to about 105,000, preferably to about 50,000, more typically to about 20,000. Generally, the quoted number of units is the whole number closest to the statistical average, and the peak of the distribution. Positive real numbers as used herein refer to a number which is positive and includes integers and fractions of integers. In the above formulas I–III, the depicted sequence of groups is not intended to represent an order or a block structure. The above formulas I–III are to be broadly read as representing random structures, block structures, or random-block structures. Further, then units broadly represent a homo or block or random selection. For example, the n units may represent n repeating units of oxyethylene groups, a random mixture of oxyethylene and oxypropylene groups, or blocks of oxyethylene and oxypropylene groups in any sequence.

With respect to formulas I–III above, each of the surfactant molecules contain a polyoxyalkylene moiety. With respect to formula I above, the hydrophilic carboxylic acid can be produced through the oxidation of a polyoxyalkylene molecule by any conventional know process, including, but limited to, the processes described in U.S. Pat. No. 5,250,727, incorporated herein by reference. The molecule corresponding to formula II above may be prepared by reacting the hydrophilic carboxylic acid with an epoxy resin, or by reacting the carboxylic acid with an epihalohydrin, followed by dehydrohalogentation, in which case w is 0. The molecule corresponding to formula III above may be prepared by reacting a polyoxyalkene monool or polyol with an epoxy resin, or by reacting it with an epihalohydrin followed by dehydrohalogentation, in which case w is 0. As each of these surfactant molecules corresponding to formulas I–III contain polyoxyalkylene moieties, the preparation of polyoxyalkene monools and polyols is now described.

A typical polyoxyalkylene monool or polyol can be represented by the formula:

wherein each R, m, n, and p are as defined above. Generally, the quoted number of units is the whole number closest to the statistical average, and the peak of the distribution. In a more usual embodiment, the n units represent oxyethylene or oxyethylene and oxypropylene groups, p is 0, and m is one or two, the number average molecular weight being from at least 1000 to about 20,000.

The hydrophilic polyoxyalkyene molecule may be prepared by reacting an intiator molecule with an alkylene oxide under oxyalkylation conditions well known to those of ordinary skill in the art of polyether polyols, such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Any suitable alkylene oxide may be used such as ethylene oxide, propylene oxide, butylene oxide, amylene oxide, and mixtures of these oxides. The polyoxyalkylene monools and polyols may be prepared from other starting materials such as tetrahydrofuran and alkylene oxide-tetrahydrofuran mixtures; epihalohydrins such as epichlorohydrin; as well as aralkylene oxides such as styrene oxide. The particular individual or combination of alkylene oxides chosen must be effective to stably disperse the particular species of curing agent in water.

The alkylene oxides may be added to the initiator, individually, sequentially one after the other to form blocks, in mixture to form a heteric polyether, or blocks of mixed oxyalkylene and homogeneous oxyalkyene groups. Suitable homo polyoxyalkylene monools and polyols include polyoxyethylene monool or polyol, and polytetramethylene monool or polyol. Suitable block copolymers include, for example, blocks of polyoxypropylene and polyoxyethylene, poly-1,2-oxybutylene and polyoxyethylene, poly-1,4-tetramethylene and polyoxyethylene. The blocks of polyoxypropylene or polyoxybutylene are preferably internal relative to the outermost block of other poloxyalkylenes. Other copolymers include the heteric copolymer monools and polyols prepared from blends, optionally with sequential addition, of two or more alkylene oxides. The polyalkylene polyether polyols may be terminated with either primary or secondary hydroxy groups. We have found that polyoxyalkylene molecules containing ethylene oxide work well, such as those having an EO/PO/EO block structure. Thus, where propylene or butylene oxide is used, it is preferred that the amount of such oxides is no more than 40 mole percent to ensure that the polyoxyalkylene molecule overall is hydrophilic.

The intiator molecule can be monofunctional or polyfunctional. The functionality of the surfactant will nominally be that of the intiator. The actual functionality of the surfactant molecule will be somewhat less due to the formation of chain terminating points of unsaturation during the oxyalkylation process, especially where propylene oxide is added in significant quantities.

Examples of the initiator molecule include the alkanols and low molecular weight polyols having a number average molecular weight of 500 or less, such as alkanols having an average number of carbons ranging from 1 to 32, like methanol, ethanol, propanol, butanol, and the NEODOL® alcohols commercially available from Shell Chemical Company, or ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, alpha-methyl glucoside, sucrose, sorbitol, and compounds derived from phenol such as 2,2-bis(4-hydroxyphenyl)-propane, commonly known as Bisphenol A. Preferable initiator molecules include alkanols having an average number of carbons ranging from 1 to 20, trimethylolpropane, ethylene and propylene glycol, glycerine, dipropylene glycol, and 2,2-bis (4-hydroxyphenyl)-propane and blends thereof.

Other initiators include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di, and trialkanolamines, ethylene diamine, propylene diamine, diethylenetriamine, methylamine, triisopropanolamine, 1,3-diaminopropane, 1,3-diaminobutane, and 1,4-diaminobutane.

Other intiator molecules include polyhydric polythioethers, polyhydroxyl-containing phosphorus compounds, polyacetals, and aliphatic thiols.

Once the polyoxyalkylene monool or polyol is made, the molecule may be oxidized as described above to produce a surfactant represented by formula I, and further reacted with an epoxy resin to produce a surfactant corresponding to formula II, or the monool or polyol may be reacted with an epoxy resin to prepare a surfactant molecule corresponding to formula III.

As noted above, the hydrophilic carboxylic acid can be produced by oxidation of a polyoxyalkylene molecule by any conventional know process, including, but limited to, the processes described in U.S. Pat. No. 5,250,727. Generally, oxygen is added to the polyalkylene glycol in the presence of a free radical (e.g., 2,2,6,6-tetramethyl-1-piperidinyloxy) and an inorganic acid (e.g., nitric acid) to produce the carboxylic acid until substantially all of the alcohol groups are oxidized to carboxylic acid groups.

The epoxy-functionality can be introduced by reacting a polyether monool or polyol, or its carboxylic acid derivative, with an epoxy resin having a functionality of at least about 1.5 epoxide group per molecule under conditions effective to react the hydroxyl or acid group on the polyoxyalkylene molecule with the epoxide group. Typically, the mole ratio of the monool, polyol, or carboxylic acid to epoxy resin is within the range of about 1:1 to about 1:500. If desired, the monool or polyol may be reacted with a stoichiometric excess of the epoxy resin such that the surfactant composition contains free unreacted epoxy resin molecules. The reaction is typically carried out at a temperature from ambient temperature to an elevated temperature sufficient to react the hydroxyl or acid group and the epoxide group preferably within the range of from about 90° C. to about 150° C. for a time effective to produce the reaction products. The progress of the reaction can be monitored and targeted to produce the desired product by measuring the hydroxyl number, acid equivalent weight and/or the epoxy equivalent weight of the reactant mixture. Generally, the reaction mixture is heated until about 95%, preferably until at least 99%, of the original number of equivalents of hydroxyl or acid equivalents is consumed. The reaction can proceed at atomospheric pressure.

Preferably, the reaction between the hydroxyl or carboxylic acid groups, and the epoxide groups, in the course of making the surfactant molecule, is carried out in the presence of a catalyst. The catalysts are bases or metal chelates such as, for example, ammonium compounds, phosphonium compounds, tertiary amines, and phosphines. Examples of more preferred catalysts include, for example, triphenylphosphonium acid acetate, ethyltriphenyl phosphonium iodide, benzyldimethylamine, triphenylphosphine, tributylamine, aluminum salicylates, tetramethylammonium hydroxide and the like. The amount of catalyst present is preferably from about 0.05 to about 2.0 weight percent based on the total weight of the epoxy resin and the polyoxyalkylene molecule.

The epoxy resins used to make the reactive surfactant can be any reactive epoxy resin having a 1,2-epoxy equivalency (functionality) preferably, on the average, greater than about 1.5 epoxide groups per molecule. Any of those described above with respect to making the substituted glycidyl ester compound are suitable for making a reactive surfactant compound.

The optional e) monoglycidyl, monocarboxylic acid, or monoisocyanate capping agent can be an aliphatic, alicyclic, or aromatic compound attached to the functional group. At least with respect to making the curing agent composition, reacting at least a portion of unreacted primary amine hydrogen with the capping agent reduces the chance for carbamate formation from atmospheric moisture reacting with the primary amine hydrogens, normally appearing as a blush on the coating and leading to chain scission. In addition to reducing the effect of blushing by reacting out with the capping agent some or all of the primary amine groups in the curing agent ,composition, or in the surfactant composition, if any exist, the molecule will have a free secondary amine hydrogen active for reaction with epoxy groups. In a preferred embodiment, it is desirable to avoid reacting the capping agent with functional groups which would yield the structure —NH—CO—, since the carboxy group tends to deactivate the amine hydrogen. Reacting a primary amine on the a substituted glycidyl ester-amine adduct with a glycidyl functionality, however, leaves the secondary amine hydrogen more active for reaction with an epoxy resin. Thus, one can achieve the dual advantage of reducing blush while retaining sufficient reactivity to cure the system at ambient temperatures in the absence of external catalysts. Reaction with a monoglycidyl capping agent also leads to the formation of a hydroxyl group, which would also be available to react with the epoxy component. In view of their ready availability, good chemical resistance, hydrolytic stability, and provision of a reactive secondary amine hydrogen and an epoxide reactive site, the monoglycidyl capping agents are preferred.

Non-limiting examples of monoglycidyl capping agents which are suitable for use in the invention include:

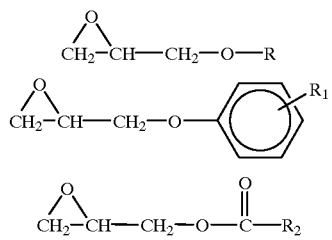

wherein R and $R_2$ are the same or different and are a branched or linear alkyl, an alkalicyclic, polyoxyalkyl, or alkenyl group having 2–100 carbon atoms, optionally branched; and $R_1$ is hydrogen or a branched or unbranched alkyl having 1–18 carbon atoms. There may be more than one type of $R_1$ group attached to the aromatic ring.

These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the Neodol® name; epoxy ethers of monovalent phenols such as phenol, cresol, and other phenols substituted in the o- or p-positions with $C_1$–$C_{21}$ branched or unbranched alkyl, aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoglycidyl capping agents useful to the practice of the invention include alkyl glycidyl ethers with 1–18 linear carbon atoms in the alkyl chain such as butyl glycidyl ether or a mixture of $C_8$–$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

The aliphatic based capping agents are usually hydrophobic in character, which tends to improve the coalescence properties of the epoxy-curing agent mixture at low temperatures, and tends to lower the glass transition temperature of the film or coating. The lower glass transition temperature improves the impact strength of the cured film. Aromatic based monoglycidyl capping agents, however, have the advantage of rendering the cured film more rigid, chemically resistant, and resistant to stresses at high temperatures. Any one of these types of capping agents may be used, and mixtures thereof are also advantageous to attain an overall balance of mechanical strength and chemical resistance.

If used in the manufacture of the surfactant composition, and in the manufacture of the curing agent composition, the capping agent is reacted with the substituted glycidyl ester-amine adduct in an amount effective to provide a water borne curing agent composition which is compatible with neat or water borne bisphenol A and bisphenol F type liquid diglycidyl ether epoxy resins as well as epoxidized phenolic novolac resins. Usually, the monoglycidyl capping agent is reacted with the substituted glycidyl ester-amine adduct at a molar ratio of 0.5:1 to 2:1. While one may use more than a 2:1 ratio, it is not necessary to do so in order to convert the primary amine groups into secondary amine groups and reduce the blushing effect. If desired, the surfactant composition, if needed, and water borne curing agent composition can be partially capped with the monoglycidyl capping agent, because even a partial capping will have some effect on blush reduction.

The surfactant composition of the invention comprises a compound represented by at least one of the following formulas:

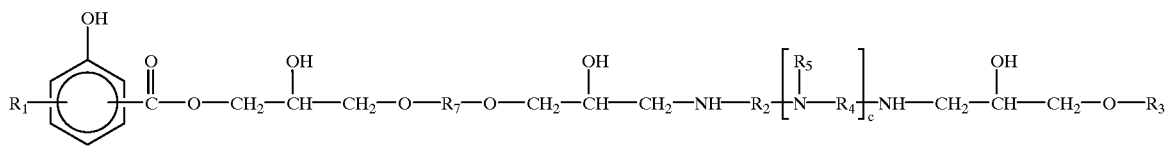

or

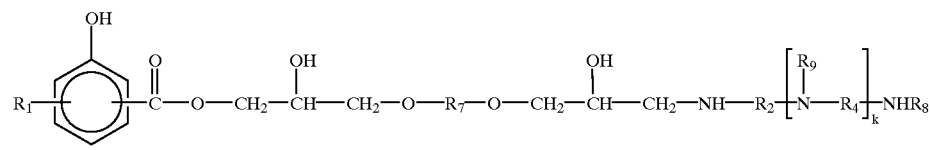

wherein $R_1$ is a branched or unbranched, substituted or unsubstituted, monovalent hydrocarbyl group having at least on carbon atom; $R_2$ and $R_4$ each independently represent a branched or unbranched, substituted or unsubstituted, divalent hydrocarbyl group having 2–24 carbon atoms, or

or

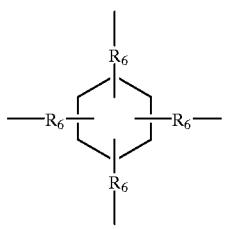

$R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, an aryl group, an alkaryl group, or an aralkyl group; $R_7$ is the residue of said b) polyepoxide compound; $R_5$ and $R_9$ are each independently hydrogen, or a branched or unbranched, substituted or unsubstituted, alkyl group or alkaryl group or cycloaliphatic group, or the residue of said d) reactive surfactant; $R_8$ is the residue of said d) reactive surfactant; c represents an integer from 1–10; and k represents an integer from 0–10; provided that at least one $R_5$ group is said the residue of said d) reactive surfactant.

In a preferably embodiment, $R_1$ is greater than 12; c is an integer from 1–4; k is an integer from 0–4. For ease of manufacture, the latter structure is preferred. However, where a capping agent is used, $R_3$ is the residue of an alkyl glycidyl ether having 1–24 branched or unbranched carbon atoms in the alkyl chain, an alkaryl glycidyl ether, an aryl glycidyl ether, an allyl glycidyl ether, an alicyclic alkyl glycidyl ether, or a glycidyl ester of a monocarboxylic acid. In a more preferable embodiment, $R_3$ is the residue of an alkyl glycidyl ether having 2–18 carbon atoms or an alkaryl glycidyl ether wherein the alkyl has 1–24 carbon atoms, and most preferably is the residue of butyl glycidyl ether, cresyl glycidyl ether, phenyl glycidyl ether, nonylphenyl glycidyl ether, p-tert-butyl glycidyl ether, or an alkyl glycidyl ether having 8–16 branched or unbranched alkyl carbon atoms.

The surfactant composition can be made and isolated as such, or it can be made "in-situ." There are several methods for making the surfactant composition in situ as described above. The amount of reacted surfactant compound in the curing agent composition, as noted above, can range from only 1 wt % to 10 wt %. The surfactant composition be combined with the curing agent composition by admixing the surfactant composition with the curing agent composition in an amount calculated to provide 1 wt % to 10 wt % of reacted surfactant compound based on the weight of the curing agent and the surfactant composition, or preferably, the reacted surfactant compound can be combined with the curing agent composition by reacting the reactive surfactant in situ in a stoichiometric excess of the curing agent composition, at any stage of making the curing agent composition beyond the manufacture of the substituted glycidyl ester compound, to obtain a curing agent composition containing from 1 to 10 wt % of the reacted surfactant compound. In the latter embodiment the curing agent composition contain the same substituted glycidyl ester moiety as does the surfactant composition. In either case, the curing agent composition of the invention can then be mixed with water in amounts necessary to produce the desired level of solids. Thus, the water borne curing agent of the invention advantageously contains a reacted surfactant having a moiety which is identical in structure to the curing agent it is designed to disperse in water, and also contains a moiety which is a high molecular weight hydrophilic strand adapted for stably dispersing the curing agent in water.

The curing agent composition used is advantageously the reaction product of the a) phenolic compound, the b) polyepoxide compound, the c) polyamine compound, and the e) capping agent, as described above with respect to the surfactant composition, and more preferably, contains all the same reactants as used to make the surfactant composition.

The curing agents of the invention can optionally be mixed with other conventional curing agents. The amount of other conventional curing agents admixed will depend upon the requirements placed upon the end product and the efficiencies one desires to achieve. If the end use does not require a product which has high end physical properties and/or it is not important to have lowered processing times, then greater amounts of an inexpensive conventional curing agent can be mixed with the curing agent composition of the invention. The amount of the curing agent in the water borne curing agent composition can range in the low end of from 1 to 50 wt. % based on the weight of all curing agents, but is preferably from 50 wt % to 100 wt. %.

Conventional curing agents are usually polyamines with at least 2 nitrogen atoms per molecule and at least two reactive amine hydrogen atoms per molecule. The nitrogen atoms are linked by divalent hydrocarbyl groups. Other hydrocarbyl groups such as aliphatic, cycloaliphatic or aromatic groups may also be singly linked to some of the nitrogen atoms. These polyamines contain at least 2 carbon atoms per molecule. Preferably polyamines contain about 2 to about 6 amine nitrogen atoms per molecule, 2 to about 8 amine hydrogen atoms per molecule, and 2 to about 50 carbon atoms.

Examples of the polyamines useful as conventional curing agents for epoxy resins include aliphatic polyamines such as ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine and the like; cycloaliphatic polyamines such as isophoronediamine, 4,4'-diaminodicyclohexylmethane, methane diamine, 1,2-diaminocyclohexane, 1,4-diaminocyclohexane, and diamines derived from "dimer acids" (dimerized fatty acids) which are produced by condensing the dimer acids with ammonia and then dehydrating and hydrogenating; adducts of amines with epoxy resins such as an adduct of isophoronediamine with a diglycidyl ether of a dihydric phenol, or corresponding adducts with ethylenediamine or m-xylylenediamine; araliphatic polyamines such as 1,3-bis (aminomethyl)benzene; aromatic polyamines such as 4,4'-methylenedianiline, 1,3-phenylenediamine and 3,5-diethyl-2,4-toluenediamine; amidoamines such as condensates of fatty acids with diethylenetriamine, triethylenetetramine, etc; and polyamides such as condensates of dimer acids with diethylenetriamine, triethylenetetramine, etc. Some commercial examples of polyamines include EPI-CURE® Curing Agent 3140 (a dimer acid-aliphatic polyamine adduct), EPI-CURE® Curing Agent 3270 (a modified aliphatic polyamine), EPI-CURE® Curing Agent 3274 (a modified aliphatic polyamine), EPI-CURE® Curing Agent 3295 (an aliphatic amine adduct), EPI-CURE® Curing Agent 3282 (an aliphatic amine adduct), EPI-CURE® Curing Agent 3055 (an amidopolyamine), EPI-CURE® Curing Agent 3046 (an amidopolyamine) and EPI-CURE® Curing Agent 3072 (modified amidoamine), and EPI-CURE® Curing Agent 3483 (an aromatic polyamine) available from Shell Chemical Company. Mixtures of polyamines can also be used.

The epoxy resin component for reaction with the water borne curing agent composition has at least one 1,2-epoxy group per molecule. Mixtures of epoxy compounds having one epoxy functionality and two or more epoxy groups are also suitable. The epoxy compounds having two or more epoxy groups per molecule means that the nominal functionality is two or more. Generally epoxy resins contain a distribution of compounds with a varying number of 1,2-epoxy equivalency. The actual average functionality of these epoxy compounds is about 1.5 or more. Any of the epoxy compounds mentioned above with respect to the epoxy resin used for reacting onto the polyoxyalkylene monool, polyol, or carboxylic acid can be employed as the epoxy resin component for reaction with the water borne curing agent.

Commercial examples of the preferred epoxy compounds having a nominal functionality of two or more include, for example, EPON® Resins DPL-862, 828, 826, 825, 1001, EPONEX® Resin 1510, HELOXY® Modifiers 107, 67, 68, and 32; all available from Shell Chemical Company and Union Carbide Epoxy Resins ERL-4221, -4289, -4299, -4234 and -4206.

The curing agent composition of the invention may include other additives, such as fillers, elastomers, stabilizers, extenders, plasticizers, accelerators, pigments, reinforcing agents, flow control agents and flame retardants depending on the application.

Advantageously, the curable epoxy resin composition is cured in the absence of catalyst compounds which accelerate the reaction between the curing agent and the epoxy resin, commonly known as accelerators. An accelerator, however, can be included, if desired, to increase the cure rate of the epoxy resin-curing agent system beyond that already achieved in its absence. Various amine-compatible accelerators can be used as long as they are soluble in the amine curing agents Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylicdiimide and saccharin.

When the cure rate at the desired temperature is suboptimal, it is sometimes desirable to include the accelerator. For example, for adhesive applications and civil engineering applications where application at low temperature is desired, it may be desirable to include the accelerator.

The accelerators are typically present in an amount of from about 0.1 weight percent to about 10 weight percent, preferably to 5 weight percent, based on the epoxy resin, if used at all.

For coating applications, the curable epoxy resin component, or the water borne curing agent composition, can also contain pigments of the conventional type such as iron oxides, lead oxides, strontium chromate, carbon black, titanium dioxide, talc, barium sulfate, phthalocyanine blue and green, cadmium red, iron blue, chromic green, lead silicate, silica, silicates and the like. Such pigments can be added to the polyamine curing agent component or the epoxy resin component prior to mixing them together. Their amounts usually range from 20 to 100 pbw based on the weight of the epoxy resin and the curing agent composition.

For floor topping application, the curable epoxy resin component or the water borne curing agent composition can also contain a filler such as sand, other siliceous materials, iron or other metals. Small amounts of thixotropic agents, coloring agents, inert plasticizers, and leveling agents can also be incorporated in the curable epoxy resin composition if desired. These curable flooring compositions can be trowelled, sprayed or brushed on to a floor substrate.

Re-inforcing agents may be added to either of the components, and include natural and synthetic fibers in the form of woven, mat, monofilament, chopped fibers and the like. Other materials for re-inforcing include glass, ceramics, nylon, rayon, cotton, aramid, graphite and combinations thereof. Suitable fillers include inorganic oxides, inorganic carbonates, ceramic microspheres, plastic microspheres, glass microspheres, clays, sand, gravel and combinations thereof. The fillers can be used in amounts suitably from 0 to 100 pbw of the combined epoxy/curing agent components.

Aside from coating applications, the curing agent compositions of the invention and the two component compositions utilizing the curing agents compositions can be used in such applications as flooring, casting, crack or defect repair, molding, adhesives, potting, filament winding, encapsulation, structural and electrical laminates, composites and the like.

The two component compositions of the invention are mixed and cured, preferably in the absence of external accelerators, in a wide range of temperatures ranging from $-25°$ C. to $100°$ C.

The curing agent compositions of the invention can also be used in thermosetting powder coating compositions prepared by the various methods known to the powder coating industry: dry blending, melt compounding by two roll mill or extruder and spray drying. Typically the process used is the melt compounding process: dry blending solid ingredients in a planetary mixer and then melt blending the admixture in an extruder at a temperature within the range of about $80°$ C. to $130°$ C. The extrudate is then cooled and pulverized into a particulate blend.

The thermosetting powder composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a powder composition to promote uniform and thicker powder deposition. After application of the powder, the powder-coated substrate is baked, typically at about $120°$ C., preferably from about 150° C., to about 205° C. for a time sufficient to cure the powder coating composition, typically from about 1 minute to about 60 minutes, preferably from about 10 minutes to about 30 minutes.

The following examples illustrate an embodiment of the invention and are not intended to limit the scope of the invention.

EXAMPLE

DIAMINE is a 2 methyl-pentamethylenediamine commercially available as Dytek-A having a molecular weight of about 119.

HELOXY® Modifier 62 is a commercial grade of ortho-cresyl glycidyl ether manufactured by Shell Chemical Company, that is produced by treatment of ortho-cresol with epixhlorohydrin and sodium hydroxide. HELOXY Modifier is a thin liquid having a viscosity at 25° C. of about 7 centipoise and an epoxide equivalent weight of about 175 to about 195.

SURFACTANT COMPOSITION A is a carboxylated poloxyethylene molecule derived from carboxylating a polyoxyethylene monool having a number average molecular weight of about 5000.

EPOXY RESIN A is a dispersion of an epoxy resin substantially equivalent to EPON® 1001 resin having an equivalent weight per epoxide group of about 450–550, in water having a functionality of less than 2.

Example 1

This example illustrates the synthesis of self emulsifiable water borne curing agent composition containing a surfactant composition made in situ. The curing agent is a substituted aromatic glycidated ester-amine adduct end capped with a monoglycidyl ether, stabilized as an oil in water emulsion through a reacted surfactant made in situ by reacting Surfactant A onto a substituted aromatic glycidated ester-amine adduct. In Stage 1, the substituted aromatic glycidated ester compound is made. In Stage 2, the remainder of the reactions are described.

Stage 1

500 grams of EPIKOTE® 828 in xylene, which is a bisphenol A based diepoxy resin available from Shell Chemicals Europe; 327 grams of a 63 wt. % 3-alkyl substituted salicyclic acid mixture in xylene (corresponding to about 20 mole % per epoxy group), in which the alkyl group contains from 14 to 18 carbon atoms and the mixture contains less than 15 mole % of $C_{14}$–$C_{18}$ alkyl phenols and less than 5 mole % of dicarboxylic acid species; and 0.15 grams of ethyltripenylphosphoniumiodide were mixed together in a vessel equipped with a condenser. The reaction temperature was increased to 175° C. (heating up to 110° C. in 30 minutes, holding for another 30 minutes at 110° C. and then heating to 175° C. within the next 60 minutes, and holding the temperature at 175° C. for the next 30 minutes, for a total reaction time of 2.5 hours. Water and xylene were stripped off. Subsequently, the substituted aromatic glycidyl ester composition was allowed to cool. Once cooled, the product was dissolved in xylene to about 80 wt. % solids. The product had an acid number of zero (theoretical) in solution and an acid number of zero (theoretical) based on solids. This product is designated as SSAEP Stage 2

A 4 necked 2 liter round-bottomed glass flask was equipped with a condenser having a water trap, a nitrogen inlet, an acid inlet, and the DIAMINE inlet. The flask was flushed with nitrogen. 357 g of the DIAMINE, representing about 6 equivalents, were charged and heated to 93° C., 505 g of SSAEP, representing about 1 equivalent, were charged to the flask at a rate such that the heat of reaction did not exceed 121° C. After addition was complete, the reaction temperature was held at 93° C. for 60 minutes. Excess DIAMINE and xylene were distilled off at about 140° C. under about 1.5 mmHg. The reaction product had an amine value of about 207.5 mg KOH/g.

Subsequently, 44.18 g of Surfactant A, representing about 0.009 equivalents, were charged to the flask at about 121° C. and heated to about 200° C. for 2 hours. The reaction mixture was cooled to about 93° C., after which 1 80g of Heloxy® Modifier 62, representing about 0.99 equivalents, were added to the reaction vessel at a rate such that the maximum temperature did not exceed 121° C., after which the reaction was held at 93° C. for 60 minutes. The reaction mixture was allowed to cool to about 78° C. Water was added until the reaction mixture was inverted from a water in oil emulsion to an oil in water emulsion. The inversion occured at about 65% solids. Further water was added to reduce the level of solids to 50%. The emulsion was sheared until the average particle size was less than 2 microns.

Example 2

150 g of Epoxy Resin A was hand mixed with 102.15 g of the water borne curing agent prepared according to example 1 in the absence of external accelerator compounds, at an equivalent ratio of about 1:1, and allowed to cure at about 75° F. and about 70% relative humidity. The mixture was drawn down on a Lemeta chart with a 2 mil Bird bar. The specular gloss pot life was about 4–5 hours based on a 60° angle of incidence. The viscosity pot life was in excess of 6 and one-half hours. Thus, the water borne curing agent composition was compatible with the water borne epoxy resin composition, was self emulsifiable, and coalesced well as a film.

What I claim is:

1. A water borne curing agent composition comprising a solid phase dispersed in a continuous phase, the continuous phase comprising water, the solid phase comprising a curing agent composition and a surfactant composition, said surfactant composition comprising the reaction product of:
    a) a phenolic acid compound substituted with at least one carboxyl group and at least one hydrocarbyl group having at least 1 carbon atom;
    b) a polyepoxide compound;
    c) a polyamine compound having at least two primary amine groups;
    d) a reactive surfactant; and optionally
    e) a monoglycidyl, monocarboxylic acid, or monoisocyanate capping agent;

said reactive surfactant comprising a functional moiety reactive toward secondary amines and a hydrophilic moiety of a nature and length effective to disperse the curing agent in water said curing agent composition comprising the reaction product of ingredients a), b, and c).

2. The water borne curing agent composition of claim 1, comprising reacting the phenolic acid compound with the polyepoxide compound to form a substituted aromatic glycidyl ester compound, and reacting the substituted aromatic glycidyl ester compound with at least the c) polyamine compound and the d) reactive surfactant.

3. The water borne curing agent composition of claim 2, wherein the carboxylic acid group(s) on said phenolic acid compound is reacted to substantial completion with the polyepoxide compound prior to reaction with the polyamine compound.

4. The water borne curing agent composition of claim 2, wherein the reaction between the polyepoxide compound and the phenolic acid are carried out at molar ratios of greater than 1:1, respectively.

5. The water borne curing agent composition of claim 2, wherein the polyepoxide has an average of 1.7 or more oxirane groups.

6. The water borne curing agent composition of claim 1, wherein the polyepoxide compound comprises a compound represented by the formulas:

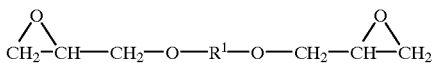

(VII)

or

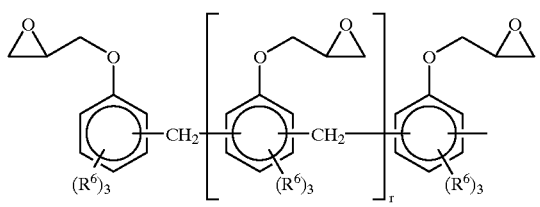

(VIII)

or

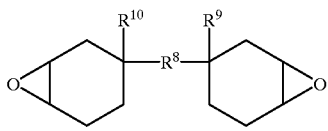

or

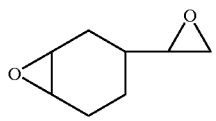

(IX)

wherein r is a real number from about 0 to about 6, $R^1$ is a divalent aliphatic group, a divalent cycloaliphatic group, a divalent aryl group, or a divalent arylaliphatic group;, $R^6$ is independently a hydrogen or a $C_1$–$C_{10}$ alkyl group; $R^8$ is a divalent aliphatic group optionally containing ether or ester group(s) or together with $R^9$ or $R^{10}$ form a spiro ring optionally containing heteroatoms; and $R^9$ and $R^{10}$ are independently hydrogen or $R^9$ or $R^{10}$ together with $R^8$ form a spiro ring optionally containing heteroatoms.

7. The water borne curing agent composition of claim 1, wherein the phenolic acid compound comprises a substituted salicyclic acid.

8. The water borne curing agent composition of claim 7, wherein the phenolic acid compound comprises salicyclic acid substituted with an 8 to 36 carbon alkyl group.

9. The water borne curing agent composition of claim 8, wherein the salicyclic acid is substituted with a branched or unbranched 14 to 24 carbon alkyl group.

10. The water borne curing agent composition of claim 3, wherein said substituted aromatic glycidyl ester compound is reacted with said polyamine compound to make a substituted aromatic glycidyl ester—amine adduct, followed by i) combining and reacting the e) capping agent with said substituted aromatic glycidyl ester-amine adduct to form a capped substituted aromatic glycidyl ester-amine adduct, followed by combining and reacting the d) reactive surfactant, or ii) combining and reacting the substituted aromatic glycidyl ester-amine adduct with the d) reactive surfactant.

11. The water borne curing agent composition of claim 10, wherein at least one mole of the polyamine compound is reacted per mole of the substituted aromatic glycidyl esters.

12. The water borne curing agent composition of claim 1, wherein the polyamine compound further contains at least one secondary amine group.

13. The water borne curing agent composition of claim 12, wherein the polyamine compound comprises diethylene triamine, triethylene tetramine, or m-xylylene diamine.

14. The water borne curing agent composition of claim 10, comprising a monoglycidyl capping agent, and i) reacting the monglycidyl capping agent with the said substituted aromatic glycidyl ester-amine adduct at a molar ratio of 0.5:1 to 2:1, respectively.

15. The water borne curing agent composition of claim 14, wherein the monoglycidyl capping agent comprises an alkyl glycidyl ether having 1–24 branched or unbranched carbon atoms in the alkyl chain, an alkaryl glycidyl ether, an aryl glycidyl ether, an allyl glycidyl ether, an alicyclic alkyl glycidyl ether, or a glycidyl ester of a monocarboxylic acid.

16. The water borne curing agent composition of claim 1, comprising a monoglycidyl capping agent.

17. The water borne curing agent composition of claim 16, wherein the monoglycidyl capping agent comprises an alkyl glycidyl ether having 2–18 carbon atoms, and aryl glycidyl ether, or an alkaryl glycidyl ether wherein the alkyl has 1–24 carbon atoms.

18. The water borne curing agent composition of claim 16, wherein the monoglycidyl ether comprises butyl glycidyl ether, cresyl glycidyl ether, phenyl glycidyl ether, nonylphenyl glycidyl ether, p-tert-butyl glycidyl ether, or an alkyl glycidyl ether having 8–16 branched or unbranched alkyl carbon atoms.

19. The water borne curing agent composition of claim 1, wherein said functional moiety in the reactive surfactant comprise epoxide groups, carboxylic acid groups and anhydrides thereof, isocyanate groups, or mixtures thereof.

20. The water borne curing agent composition of claim 19, wherein the hydrophilic moiety in the reactive surfactant comprises a polyoxyalkylene monool or polyol residue.

21. The water borne curing agent composition of claim 20, comprising admixing the surfactant composition with the curing agent composition.

22. The water borne curing agent of claim 20, wherein the surfactant composition is formed in situ in the curing agent composition by:

iii) reacting the reactive surfactant with a stoichiometric excess of the curing agent composition, said curing agent composition comprising an end capped substituted aromatic glycidyl ester-amine adduct comprising the reaction product of said a), b), c), and e); or iv) reacting the reactive surfactant with the c) polyamine compound, followed by reaction with a stoichiometric excess of a substituted aromatic glycidyl ester compounds made by reacting a) and b), followed by reacting at least a stoichiometric amount of a second portion of c) polyamine compound with the unreacted substituted aromatic glycidyl ester compounds to make a substituted aromatic glycidyl ester-amine adduct, and end capping at least a portion of unreacted primary amine groups remaining on said adduct with the e) capping agent.

23. The water borne curing agent of claim 22, wherein the amount of surfactant composition in the stable water borne curing agent composition is from 1 wt. % to 10 wt. %, based on the weight of the solid phase, and the stable water borne curing agent composition comprises 45 wt. % or more solids dispersed in the continuous phase, based on the weight of all ingredients in the water borne curing agent composition.

24. The water borne curing agent composition of claim 23, wherein the amount of surfactant composition comprises 2 to 6 wt. %.

25. The water borne curing agent composition of claim 1, wherein the average particle size of the solid phase is less than 2µ.

26. The water borne curing agent composition of claim 25, wherein the average particle size of the solid phase is 0.5µ or less.

27. The water borne curing agent composition of claim 1, wherein the curing agent composition comprises an end capped substituted aromatic glycidyl ester-amine adduct comprising the reaction product of a), b), c), and e).

28. The water borne curing agent composition of claim 1, wherein the reactive surfactant comprises a compound represented by one of the following formulas:

29. The water borne curing agent composition of claim 28, wherein Y represents an oxygen atom, R represents hydrogen, methyl, or an ethyl group, provided that at least one R is hydrogen; m represents an integer from 1 to 3, each of n and p independently represent an integer such that n+p ranges from 15 to about 4000; and w represents an integer ranging from 0 to 5.

30. The water borne curing agent composition of claim 28, wherein the X, Y, n and p units are derived from a polyoxyalkylene monool or polyol represented by the formula:

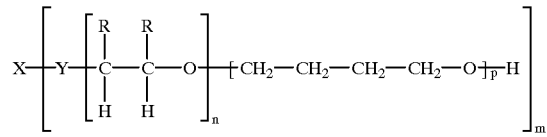

31. The water borne curing agent composition of claim 30, wherein p is 0, and m is 1 or 2.

32. The water borne curing agent composition of claim 31, wherein the polyoxyalkylene monool or polyol comprises a polyoxyethylene monool or polyol or a block copolymer of one of more blocks of polyoxypropylene and polyoxyethylene.

33. The water borne curing agent composition of claim 32, wherein the polyoxyalkylene monool or polyol comprises one or more blocks of polyoxyethylene and polyoxypropylene, one or more blocks of polyoxypropylene being internal relative to an outermost block of other poloxyethylene.

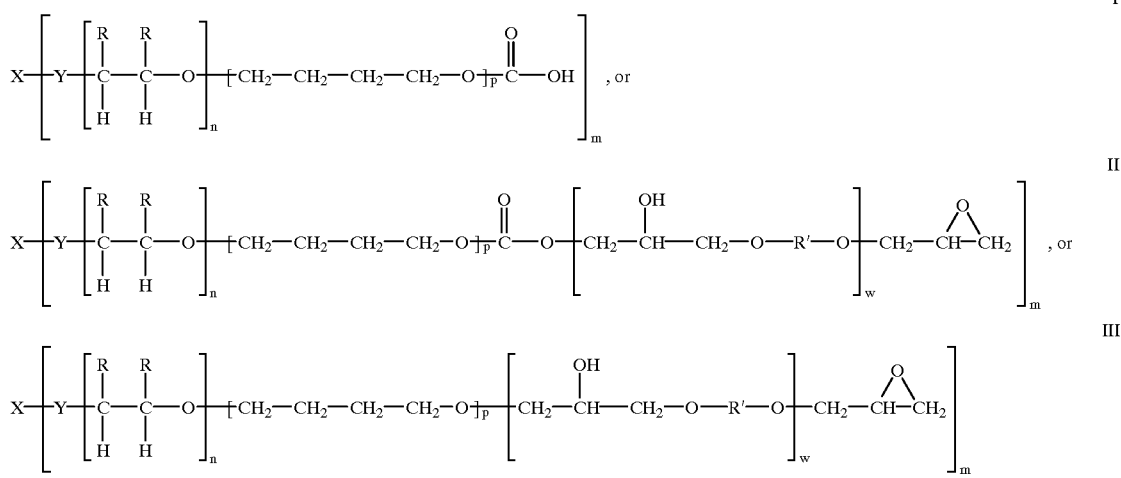

wherein X represents an intiator molecule residue, the initiator having a functionality of from 1 to 8; Y represents an oxygen or nitrogen atom; each of the R's independently represent a hydrogen, an $C_1$–$C_{16}$ alkyl, aryl, or alkaryl group, provided that at least on R is a hydrogen; R' represents an epoxy resin residue comprising a divalent aliphatic group, a divalent cycloaliphatic group, a divalent aryl group, a divalent arylaliphatic group, or a divalent alkaryl group, each having from 2 to 1000 carbon atoms; m represents a real number from 1 to 8; n and p represent the number of repeating units of oxyalkylene groups effective to stably disperse the curing agent composition in water; and w represents the number of epoxy glycidyl ether units, ranging from 0 to 20.

34. The water borne curing agent composition of claim 28, wherein the reactive surfactant comprises a molecule represented by formula II or III.

35. The water borne curing agent composition of claim 34, wherein the w ranges from greater than 0 to 5, and R' is derived from an epoxy resin having greater than 1.5 epoxide groups per molecule, said epoxy resin comprising a diglycidyl ether of a dihydric compound, an epoxy novolac, an aliphatic epoxy, or a cycloaliphatic epoxy.

36. The water borne curing agent composition of claim 35, wherein the epoxy resin comprises diglycidyl ethers of a dihydric phenol comprising 2,2-bis(4-hydroxyphenyl) propane, 2,2-bis(4-hydroxy-3-tert-butylphenyl)propane, 1,1-bis(4-hydroxyphenyl)ethane, 1,1-bis(4-hydroxyphenyl) isobutane, bis(2-hydroxy-1-naphthyl)methane, 1,5- dihydroxynaphthalene, or 1,1-bis(4-hydroxy-3-alkylphenyl) ethane; said epoxy novolac comprising the condensation of formaldehyde and a phenol followed by glycidation, said phenol comprising phenol, cresol, nonylphenol or t-butylphenol; said aliphatic epoxy comprising the diglycidyl ethers of 1,4 butanediol, neopentyl glycol, cyclohexane dimethanol, hexanediol, homogeneous polyoxypropylene glycol, and triglycidyl ethers of trimethylol ethane and trimethylol propane; said cycloaliphatic epoxy comprising 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane] bis(3,4-epoxycyclohexylmethyl)adipate, bis(3,4-epoxycyclohexyl)adipate, vinylcyclohexene dioxide [4-(1,2-epoxyethyl)-1,2-epoxycyclohexane], or a compound represented by one of the following structures:

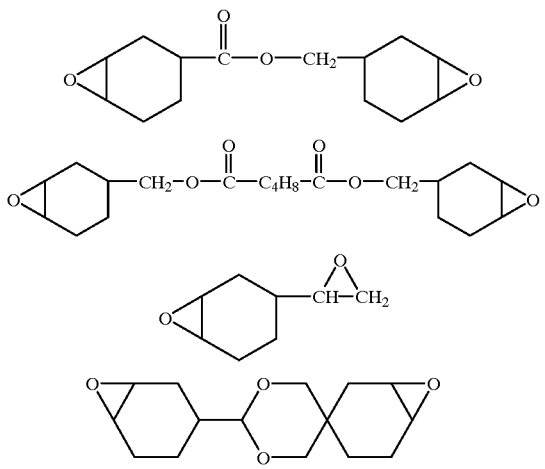

37. The-water borne-curing agent composition, comprising a cured epoxy resin comprising the reaction product of the water borne curing agent composition of claim 1 and a water borne epoxy resin composition in the absence of an external accelerator compound.

38. The water borne curing agent of claim 1, wherein said surfactant composition comprises a compound represented by at least one the following formulas:

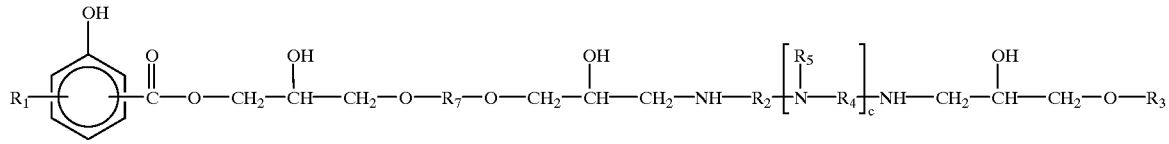

or

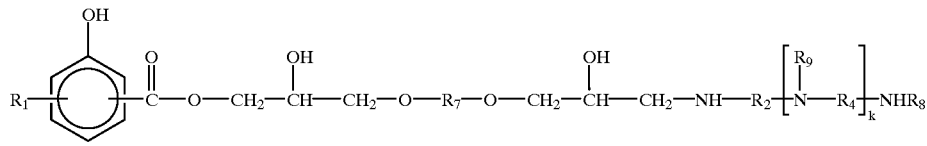

wherein $R_1$ is a branched or unbranched, substituted or unsubstituted, monovalent hydrocarbyl group having at least on carbon atom; $R_2$ and $R_4$ each independently represent a branched or unbranched, substituted or unsubstituted, divalent hydrocarbyl group having 2–24 carbon atoms, or

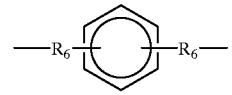

or

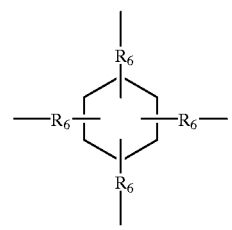

$R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, an aryl group, an alkaryl group, or an aralkyl group; $R_7$ is the residue of said b) polyepoxide compound; $R_5$ and $R_6$ are each independently hydrogen, or a branched or unbranched, substituted or unsubstituted, alkyl group or alkaryl group or cycloaliphatic group, or the residue of said d) reactive surfactant; $R_8$ is the residue of said d) reactive surfactant; c represents an integer from 1–10; and k represents an integer from 0–10; provided that at least one $R_5$ group is said the residue of said d) reactive surfactant.

39. The water borne curing agent of claim 38, wherein the carbon number of the group represented by $R_1$ is greater than 12, c is an integer from 1–4, and k is an integer from 0–4.

40. The water borne curing agent of claim 39, wherein the polyamine compound comprises diethylene triamine, triethylene tetramine, m-xylylene diamine, or an aliphatic diamine.

41. The water borne curing agent of claim 39, wherein $R_3$ comprises the residue of an alkyl glycidyl ether having 1–24 branched or unbranched carbon atoms in the alkyl chain., an alkaryl glycidyl ether, an aryl glycidyl ether, an allyl glycidyl ether, an alicyclic alkyl glycidyl ether, or a glycidyl ester of a monocarboxylic acid.

42. The water borne curing agent of claim 41, wherein $R_3$ comprises the residue of an alkyl glycidyl ether having 2–18 carbon atoms or an alkaryl glycidyl ether wherein the alkyl has 1–24 carbon atoms.

43. The water borne curing agent of claim 42, wherein $R_3$ comprises the residue of butyl glycidyl ether, cresyl glycidyl ether, phenyl glycidyl ether, nonylphenyl glycidyl ether, p-tert-butyl glycidyl ether, or an alkyl glycidyl ether having 8–16 branched or unbranched alkyl carbon atoms.

44. A surfactant composition comprising the reaction product of:
  a) a phenolic acid compound substituted with at least one carboxyl group and at least one hydrocarbyl group having at least 1 carbon atom;
  b) a polyepoxide compound;
  c) a polyamine compound having at least two primary amine groups;
  d) a reactive surfactant; and optionally
  e) a monoglycidyl, monocarboxylic acid, or monoisocyanate capping agent;
said reactive surfactant comprising a functional moiety reactive with secondary amines and a hydrophilic moiety of a nature and length effective to disperse the curing agent in water.

45. The surfactant composition of claim 44, comprising reacting the phenolic acid compound with the polyepoxide compound to form a substituted aromatic glycidyl ester compound, and reacting the substituted aromatic glycidyl ester compound with at least the c) polyamine compound and the d) reactive surfactant.

46. The surfactant composition of claim 45, wherein the carboxylic acid group(s) on said phenolic acid compound is reacted to substantial completion with the polyepoxide compound prior to reaction with the polyamine compound.

47. The surfactant composition of claim 44, wherein the polyepoxide compound comprises a compound represented by the formulas:

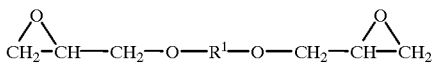

(VII)

or

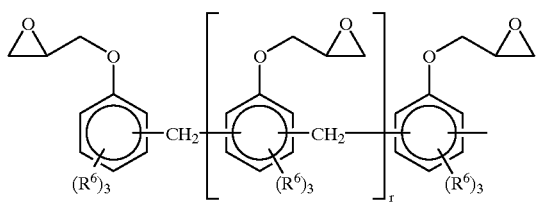

(VIII)

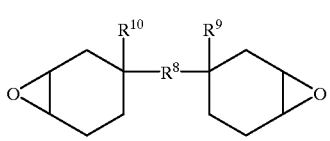

or

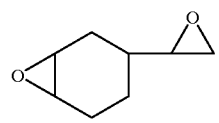

(IX)

wherein r is a real number from about 0 to about 6, $R^1$ is a divalent aliphatic group, a divalent cycloaliphatic group, a divalent aryl group, or a divalent arylaliphatic group;, $R^6$ is independently a hydrogen or a $C_1$–$C_{10}$ alkyl group; $R^8$ is a divalent aliphatic group optionally containing ether or ester group(s) or together with $R^9$ or $R^{10}$ form a spiro ring optionally containing heteroatoms; and $R^9$ and $R^{10}$ are independently hydrogen or $R^9$ or $R^{10}$ together with $R^8$ form a spiro ring optionally containing heteroatoms.

48. The surfactant composition of claim 44, wherein the phenolic acid compound comprises a substituted salicyclic acid.

49. The surfactant composition of claim 48, wherein the phenolic acid compound comprises salicyclic acid substituted with an 8 to 36 carbon alkyl group.

50. The surfactant composition of claim 49, wherein the salicyclic acid is substituted with a branched or unbranched 14 to 24 carbon alkyl group.

51. The surfactant composition of claim 44, wherein the polyamine compound comprises diethylene triamine, triethylene tetramine, m-xylylene diamine, or an aliphatic diamine.

52. The surfactant composition of claim 44, comprising a monoglycidyl ether capping agent.

53. The surfactant composition of claim 52, wherein the capping agent is reacted with a substituted aromatic glycidyl ester-amine adduct at a molar ratio of 0.5: 1 to 2:1, said substituted aromatic glycidyl ester-amine adduct comprising the reaction product of a), b) and c).

54. The surfactant composition of claim 53, wherein the monoglycidyl capping agent comprises an alkyl glycidyl ether having 2–18 carbon atoms, and aryl glycidyl ether, or an alkaryl glycidyl ether wherein the alkyl has 1–24 carbon atoms.

55. The surfactant composition of claim 44, wherein said functional moiety in the reactive surfactant comprise epoxide groups, carboxylic acid groups and anhydrides thereof, isocyanate groups, or mixtures thereof.

56. The surfactant composition of claim 44, wherein the hydrophilic moiety in the reactive surfactant comprises a polyoxyalkylene monool or polyol residue.

57. The surfactant composition of claim 44, wherein the reactive surfactant comprises a compound represented by one of the following formulas:

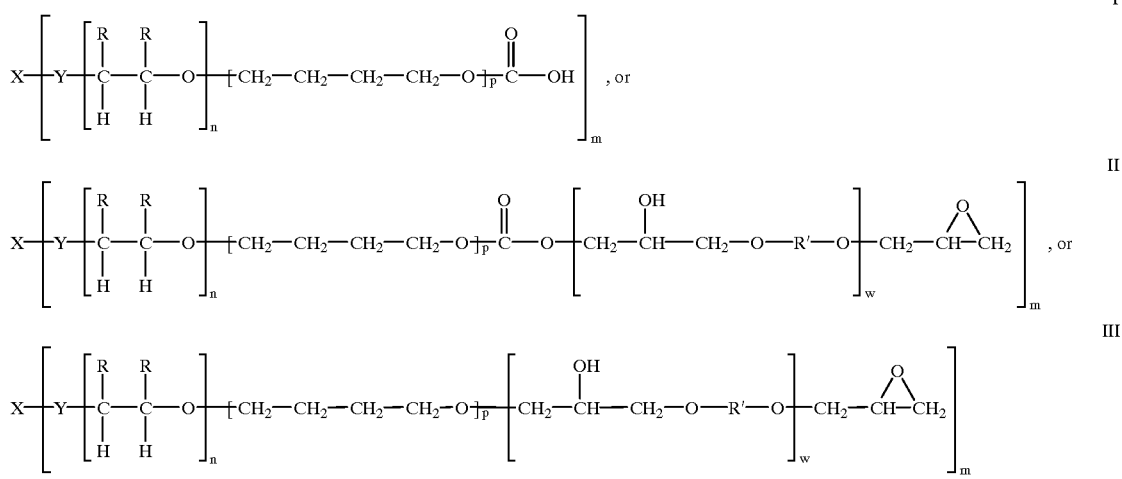

wherein X represents an intiator molecule residue, the initiator having a functionality of from 1 to 8; Y represents an oxygen or nitrogen atom; each of the R's independently represent a hydrogen, an $C_1$–$C_{16}$ alkyl, aryl, or alkaryl group, provided that at least on R is a hydrogen; R' represents an epoxy resin residue comprising a divalent aliphatic group, a divalent cycloaliphatic group, a divalent aryl group, a divalent arylaliphatic group, or a divalent alkaryl group, each having from 2 to 1000 carbon atoms; m represents a real number from 1 to 8; n and p represent the number of repeating units of oxyalkylene groups effective to stably disperse the curing agent composition in water; and w represents the number of epoxy glycidyl ether units, ranging from 0 to 20.

58. The surfactant composition of claim 57, wherein Y represents an oxygen atom, R represents hydrogen, methyl, or an ethyl group, provided that at least one R is hydrogen; m represents an integer from 1 to 3, each of n and p independently represent an integer such that n+p ranges from 15 to about 4000; and w represents an integer ranging from 0 to 5.

59. The surfactant composition of claim 57, wherein the polyoxyalkylene monool or polyol residues of formulas I, II, and III comprise one or more blocks of polyoxyethylene and polyoxypropylene, one or more blocks of polyoxypropylene being internal relative to an outermost block of other poloxyethylene.

60. The surfactant composition of claim 59, wherein the reactive surfactant comprises a molecule represented by formula II or III.

61. The surfactant composition of claim 57, wherein the w ranges from greater than 0 to 5, and R' is derived from an epoxy resin having greater than 1.5 epoxide groups per molecule, said epoxy resin comprising a diglycidyl ether of a dihydric compound, an epoxy novolac, an aliphatic epoxy, or a cycloaliphatic epoxy.

62. The surfactant of claim 44, wherein said surfactant composition comprises a compound represented by at least one the following formulas:

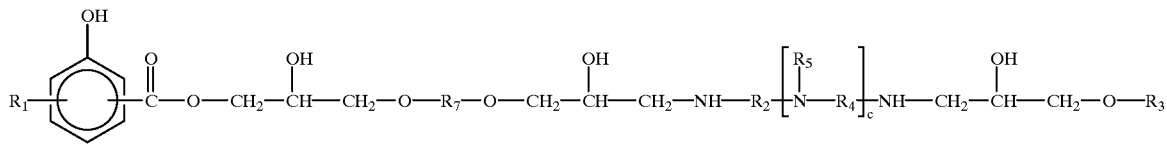

or

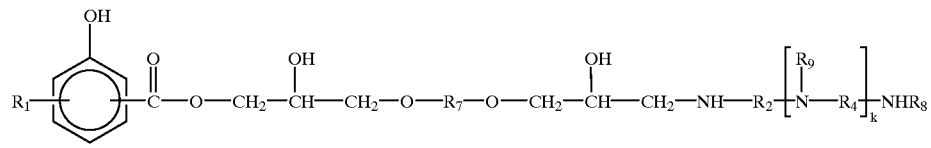

wherein $R_1$ is a branched or unbranched, substituted or unsubstituted, monovalent hydrocarbyl group having at least on carbon atom; $R_2$ and $R_4$ each independently represent a branched or unbranched, substituted or unsubstituted, divalent hydrocarbyl group having 2–24 carbon atoms, or

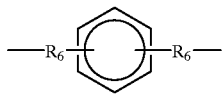

or

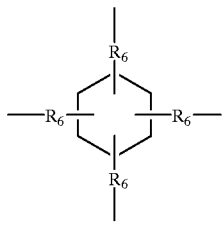

$R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, an aryl group, an alkaryl group, or an aralkyl group; $R_7$ is the residue of said b) polyepoxide compound; $R_5$ and $R_9$ are each independently hydrogen, or a branched or unbranched, substituted or unsubstituted, alkyl group or alkaryl group or cycloaliphatic group, or the residue of said d) reactive surfactant; $R_8$ is the residue of said d) reactive surfactant; c represents an integer from 1–10; and k represents an integer from 0–10; provided that at least one $R_5$ group is said the residue of said d) reactive surfactant.

63. The surfactant of claim 62, wherein the carbon number of the group represented by $R_1$ is greater than 12, c is an integer from 1–4, and k is an integer from 0–4.

64. The surfactant of claim 61, wherein $R_3$ comprises the residue of an alkyl glycidyl ether having 1–24 branched or unbranched carbon atoms in the alkyl chain, an alkaryl glycidyl ether, an aryl glycidyl ether, an allyl glycidyl ether, an alicyclic alkyl glycidyl ether, or a glycidyl ester of a monocarboxylic acid.

* * * * *